US012293650B1

(12) United States Patent
White

(10) Patent No.: US 12,293,650 B1
(45) Date of Patent: May 6, 2025

(54) WIRELESS SMOKE DETECTOR

(71) Applicant: David White, Labelle, FL (US)

(72) Inventor: David White, Labelle, FL (US)

(*) Notice: Subject to any disclaimer, the term of this patent is extended or adjusted under 35 U.S.C. 154(b) by 108 days.

(21) Appl. No.: 18/132,611

(22) Filed: Apr. 10, 2023

(51) Int. Cl.
*G08B 17/10* (2006.01)
*G08B 7/06* (2006.01)
*G08B 25/10* (2006.01)

(52) U.S. Cl.
CPC ............. *G08B 25/10* (2013.01); *G08B 7/066* (2013.01); *G08B 17/10* (2013.01)

(58) Field of Classification Search
CPC ........ G08B 25/10; G08B 7/066; G08B 17/10; H01H 9/54; H01H 47/22; G05F 1/66; G05B 2219/2642; G05B 2219/50193
USPC .......................... 340/628, 629, 630, 632, 627
See application file for complete search history.

(56) References Cited

U.S. PATENT DOCUMENTS 7,321,301 B2 1/2008 Spoltore et al.
8,610,587 B2 * 12/2013 Tropper .................. H04W 4/14 D10/106.2
8,816,867 B2 * 8/2014 Mammoto ........... G08B 29/183 340/630
9,030,319 B1 * 5/2015 Haynes .................. G08B 17/10 340/539.22
9,413,194 B2 8/2016 McCullough et al.
2013/0093593 A1 * 4/2013 Woods ................... G08B 21/14 340/628
2014/0375144 A1 * 12/2014 Thorpe ................... F23N 5/242 307/129
2016/0358722 A1 * 12/2016 Lakshmanan ............. G05F 1/66
2018/0331530 A1 * 11/2018 Samojeden ............ H02H 3/006

* cited by examiner

*Primary Examiner* — Anh V La
(74) *Attorney, Agent, or Firm* — Sanchelima & Associates, P.A.; Jesus Sanchelima; Christian Sanchelima

(57) ABSTRACT

A wireless smoke detector including a breaker assembly and a detector assembly. Breaker assembly includes a main signal receiver operatively connected to a main breaker, wherein the signal receiver is configured to receive a signal from the detector assembly by a wireless communication transmitter when the smoke detector detects smoke, thereby the main breaker may interrupt the power supply of the facility. Detector assembly is capable of being wirelessly connected to a plurality of embodiments thereof to guide the user and hearing and/or seeing impaired users to the exit by a predetermined colored light and predetermined audible alarms emitted from each smoke detector installed on the ceiling above the doorways.

12 Claims, 3 Drawing Sheets

WIRELESS SMOKE DETECTOR

BACKGROUND OF THE INVENTION

1. Field of the Invention

The present invention relates to a smoke detector and, more particularly, to a wireless smoke detector that is wirelessly connected to a plurality thereof that is intended to be placed on the ceiling above the doorway, shining down to guide the user to the exit in case of a fire, wherein a breaker is wirelessly connected to the smoke detector that cuts off the current flow of electrical installation to prevent from continuing to feed the fire area to save lives.

2. Description of the Related Art

Several designs for wireless smoke detectors have been designed in the past. None of them, however, include a main break with a signal receiver wirelessly connected to a smoke detector that is configured to be wirelessly connected to a plurality thereof, wherein the smoke detector is capable of detecting smoke, CO2 and includes a predetermined colored LED light with audible alarm to guide the user towards the exit.

Applicant believes that a related reference corresponds to U.S. Pat. No. 9,413,194 issued for an emergency lighting system. Applicant believes that another related reference corresponds to U.S. Pat. No. 7,321,301 issued for wireless children's safety light in a security system. None of these references, however, teach of a smoke and fire safety system having wireless or Bluetooth detectors, illuminated exit signs, and illuminated exit directing signs, where the different signs have different colored LEDs and different audible alarms.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a device that shuts down electrical devices such as HVAC systems to stop the fire from blowing heated gases and fire through the structure, thus helping to save lives.

It is another object of this invention to provide a device that guides the user to the exit by means of a predetermined colored LED light and a predetermined audible alarm.

It is still another object of the present invention to provide a device wireless connected to a plurality thereof and controlled by a monitoring system, providing a smoke detector system that is capable of being installed on any facility.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
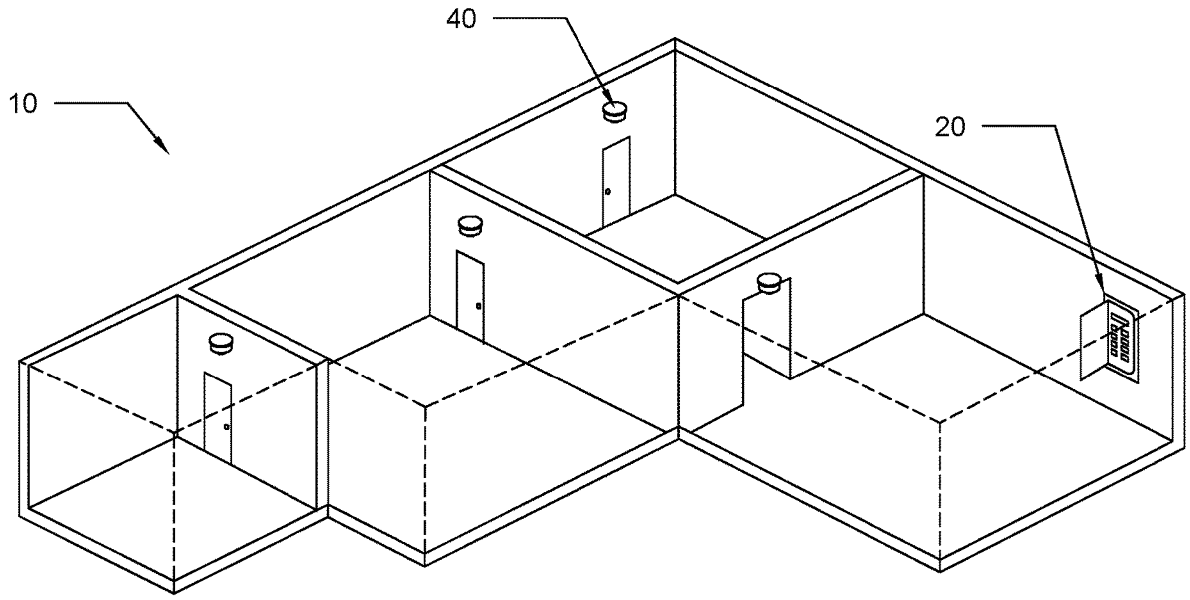
FIG. 1 represents an operational view of an exemplary embodiment of the present invention 10, wherein the detector assembly 40 and a plurality thereof are operatively connected therebetween and to the breaker assembly 20.

Referring now to the drawings, where the present invention is generally referred to with numeral 10, it can be observed that it basically includes a breaker assembly 20 and a detector assembly 40. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Breaker assembly 20 includes a main breaker 22 and a signal receiver 24. In an exemplary embodiment, the main breaker 22 may be an electrical safety device configured to be installed in the main electric panel of a residence, office, premises, or any other facility to protect the electrical circuit from damage. As FIG. 1 represents. It should be considered that the main breaker 22 may be a low-voltage circuit breaker, a solid-state circuit breaker, a magnetic breaker, thermal breaker, or any other suitable breaker. In a preferred embodiment, the signal receiver 24 may be a wireless system configured to pick up a wireless signal such as radio signal broadcast, Wi-Fi, Bluetooth or any other suitable signal, wherein the signal receiver 24 may be adapted to receive and process a plurality of signals. It should be considered that the signal receiver 24 may be operatively connected to the main breaker 22, wherein the signal receiver 24 may automatically actuate the main breaker 22 to interrupt the current flow of the electrical circuit by means of an automated mechanism included inside the main breaker.

Figure 4:
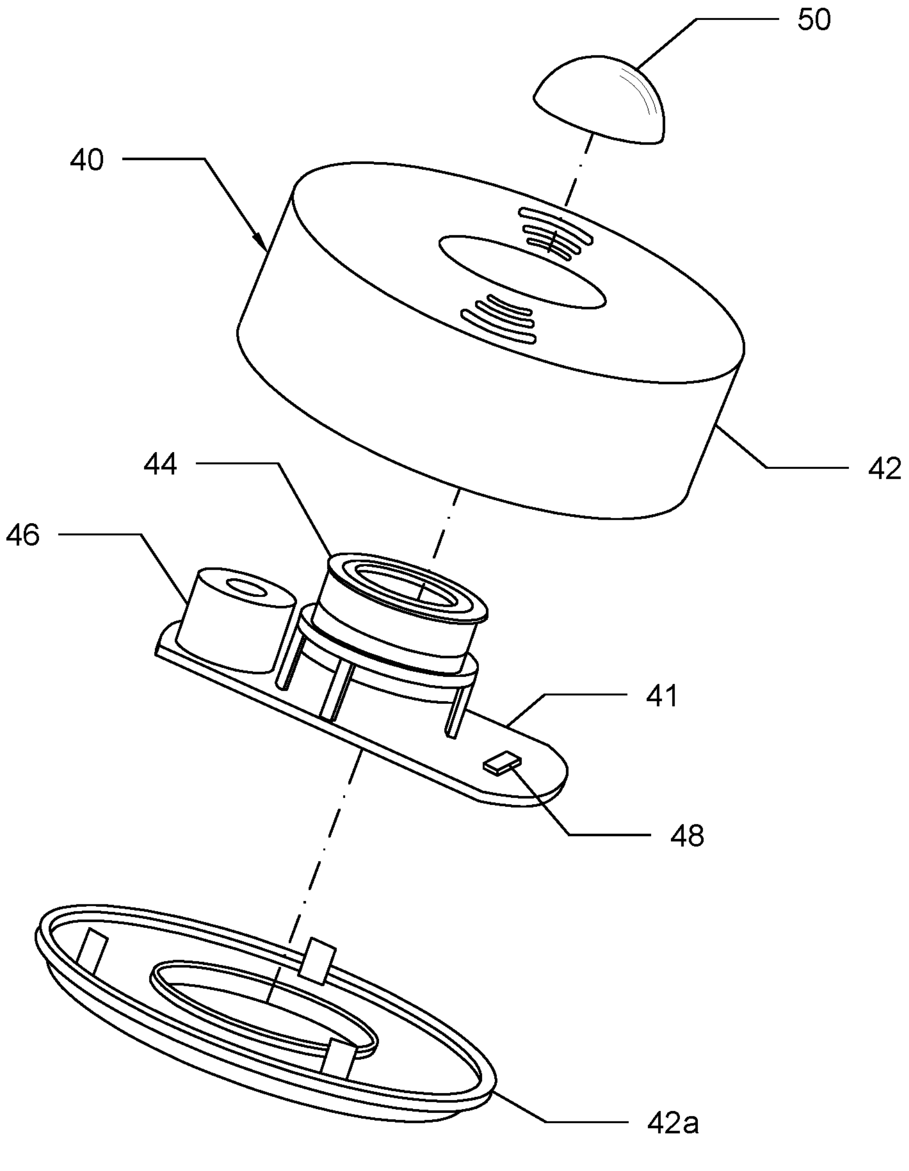
FIG. 4 is a representation of an exploded view wherein the housing 42 includes a mount plate 42*a* that is attachable onto the wall and/or ceiling, whereas the circuit board 41 with all the proper circuitry is protected by the housing 22 when attached to the mount plate 42*a*.

Detector assembly 40 includes a circuit board 41, housing 42, a smoke detector 44, detector openings 44*a*, an alarm buzzer 46, buzzer openings 46, a wireless communication transmitter 48, a light 50. In an exemplary embodiment, the circuit board 41 may be printed board with all the proper electronic elements and control circuit elements to electrically connect the smoke detector 44, the alarm buzzer 46, the wireless communication transmitter 48, and the light 50 therebetween. As FIG. 4 represents. It should be considered that the circuit board 41 may be powered by means of a battery, a plurality thereof, an external power supply, or any other power supply means. In a suitable embodiment, the circuit board 41 may be protected by the housing 42, wherein the housing 42 may have a cylindrical shape wherein the peripheral walls and the top side thereof protects the smoke detector 44, the alarm buzzer 46, the wireless communication transmitter 48, the circuit board 41 and the circuitry included therein. The housing 42 may include a mount plate 42*a* that is removably attachable from the bottom of said housing 42, as FIG. 4 depicts, wherein the mount plate 42 may conform with the shape of the housing 42 and is adapted to receive the circuit board 41 and secure it in place by means of stoppers integrally formed with the mount plate 42. As best depicted in FIG. 4. In a suitable variation, the housing 42 including the mount plate 42*a* may have a cuboid shape, a trapezoid shape or any other suitable shape that allows the circuit board 41 and the proper circuitry to be housed therein.

The housing 42 includes at the top side thereof, the detector openings 44*a* and the buzzer openings 46*a*, wherein the detector openings 44*a* and the buzzer openings 46*a* are aligned parallel with respect to the smoke detector 44 and the alarm buzzer 46 respectively. In a suitable embodiment, the smoke detector 44 may be a photoelectric sensor, an ionization smoke detector, or a radiation sensor, wherein depending on the facility, the type of sensor may be selected properly, thereby in case of fire inside the facility, the smoke may enter through the detector openings 44*a* to be detected by the smoke detector 44. In a preferred embodiment, the alarm buzzer 46 may be an audio signaling device such as a mechanical device, electromechanical, piezoelectric, or any other suitable audible device. The alarm buzzer is actuated when the smoke detector 44 detects smoke caused by fire, wherein the alarm buzzer 44 may include predetermined audible alarms.

Figure 3:
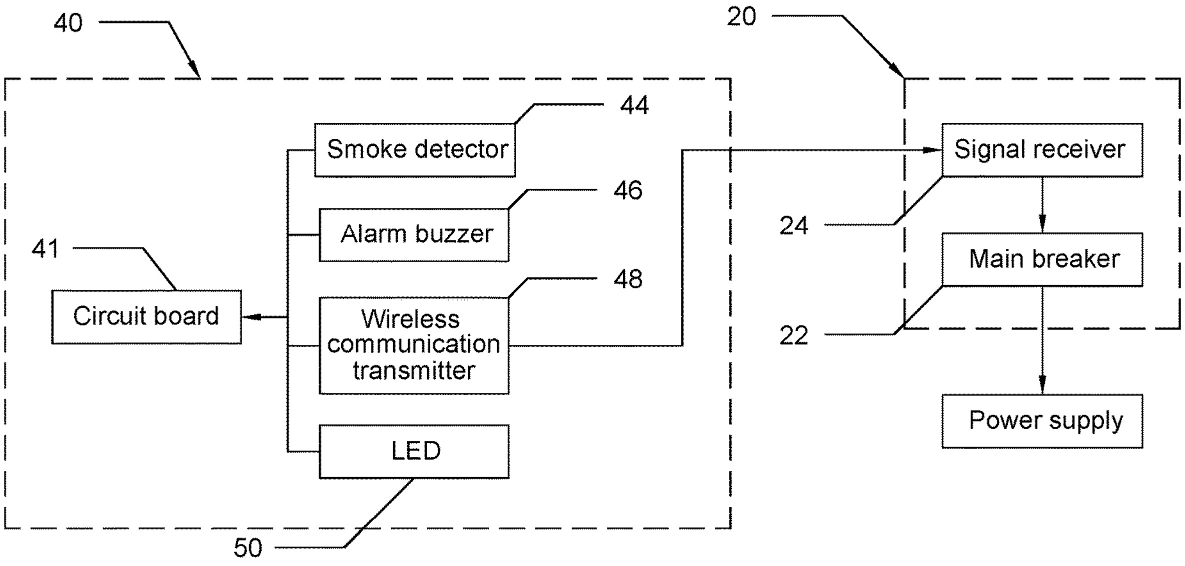
FIG. 3 illustrates a diagram showing how the detector assembly 40 and the breaker assembly 20 are operatively connected therebetween, wherein the power supply of a residence, office or the like may be interrupted by means of the main breaker b22 when detecting smoke.

The wireless communication transmitter 48 may be a wireless system that provides or emits radio wireless signals such as radio signal broadcast, Wi-Fi, Bluetooth, or any other suitable signal that are picked by the signal receiver 24. In one embodiment, the wireless communication transmitter 48 may be wirelessly connected to the breaker assembly 20, as FIG. 3 represents, thereby the main breaker 22 may interrupt the current flow when the smoke detector 44 detects smoke, where the current flow may be restored once the smoke detector does not longer detect smoke, or the current flow may be restored manually by a user.

Figure 2:
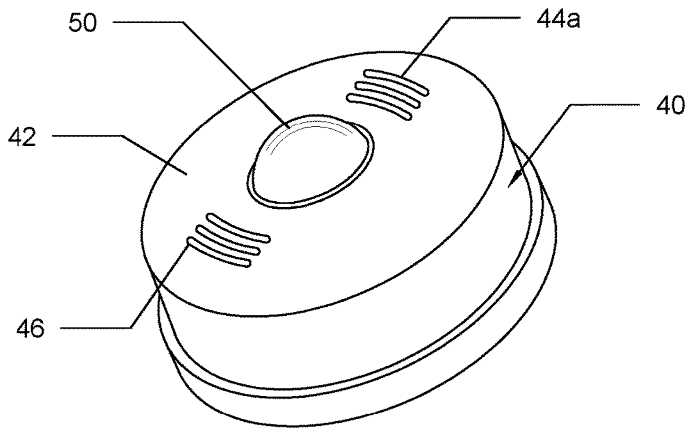
FIG. 2 shows an isometric view of the present invention 10, wherein the housing includes a LED 50 on top thereof with a predetermined colored light, and the housing further includes detector openings 44*a* that allows smoke to be detected, and buzzer openings 46*a* that helps a predetermined alarm to be listened.

Referring to FIG. 2 and FIG. 4, the light may be placed on top of the housing 42, wherein the color emitted by the light 50 may be predetermined according to where the detector assembly 40 is placed. For instance, the LED 50 may turn green with the predetermined audible alarm to guide the user towards the exit. In a suitable variation the housing 42 may have peripheral opening which a light selector or a portion thereof may protrude, thereby the user may select the color of the light without opening the housing 42. In other embodiments, the light 50 may be a LED, or any other type or light that may change its color.

Referring to the figures and more specifically to FIG. 1, the detector assembly 40 may be placed on the ceiling near by the doorway, wherein the detector assembly 20 and a plurality thereof may be wirelessly connected therebetween by means of a wireless technology such as Wi-Fi and/or Bluetooth, wherein the detector assembly and the plurality thereof are further connected to the breaker assembly 20, thereby each detector assembly 20 of the plurality thereof may be located on the ceiling near by the doorway to provide a lighted up way towards the exit. It should be considered that the detector assembly 20 placed in the other part of the structure may have different colored light such as a white penetrating LED with a different audible alarm that distinguish if trim the doorways, thereby said configuration may provide a visual and audible aid that the users may use to follow until leave the facility in case of fire. It should be considered that the detector assembly 40 and the breaker assembly 20 may be monitored by means of a monitoring system installed in an external mobile device, where the monitoring system may control, monitor and/or activate/deactivate the breaker assembly 20 and the detector assembly 40.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A wirelessly smoke detector, comprising:

a breaker assembly including a main breaker and a signal receiver, wherein said main breaker is an electrical safety device electrically connected to an electrical circuit, said signal receiver is a wireless system operatively connected to said main breaker; and a detector assembly having a circuit board, a housing, a mount plate, a smoke detector, detector openings, an alarm buzzer, buzzer openings, a selector, a wireless communication transmitter, and a light, said smoke detector, said alarm buzzer, said wireless communication transmitter, said selector and said light are electrically connected therebetween by means of said circuit board, wherein said circuit board is housed inside the housing, wherein the detector assembly includes at least one detector placed on a ceiling next to a doorway to provide a lighted up way towards the exit.

2. The wirelessly smoke detector of claim 1, wherein said main breaker includes an automated mechanism controlled by said signal receiver to interrupt a current flow of said electrical circuit.

3. The wirelessly smoke detector of claim 1, wherein said signal receiver is a wireless system that receives and processes a plurality of transmitted signals from said wireless communication transmitter and a plurality thereof.

4. The wirelessly smoke detector of claim 1, wherein said signal receiver and said wireless communication transmitter are wirelessly connected by means of radio signal broadcast.

5. The wirelessly smoke detector of claim 1, wherein said mount plate includes stoppers that are configured to receive and hold in place said circuit board.

6. The wirelessly smoke detector of claim 1, wherein said detector openings are placed on a top side of said housing, wherein said detector openings are aligned with respect to said smoke detector.

7. The wirelessly smoke detector of claim 1, wherein said buzzer openings are placed on a top side of said housing, wherein said buzzer openings are aligned with respect to said alarm buzzer.

8. The wirelessly smoke detector of claim 1, wherein said light has predetermined colored lights according where said detector assembly is placed.

9. The wirelessly smoke detector of claim 8, wherein said alarm buzzer emits a predetermined audible alarm according to said colored light.

10. The wirelessly smoke detector of claim 1, wherein said breaker assembly and said detector assembly are monitored by means of a monitoring system of an external device.

11. A wirelessly smoke detector, comprising:

a breaker assembly including a main breaker and a signal receiver, wherein said main breaker is an electrical safety device electrically connected to an electrical circuit, said signal receiver is a wireless system operatively connected to said main breaker, wherein said main breaker includes an automated mechanism controlled by said signal receiver to interrupt a current flow of said electrical circuit; and a detector assembly having a circuit board, a selector, a housing, a mount plate, a smoke detector, detector openings, an alarm buzzer, buzzer openings, a wireless communication transmitter, and a light, said smoke detector, said alarm buzzer, said wireless communication transmitter, said selector and said light are electrically connected therebetween by means of said circuit board, wherein said circuit board is housed inside the housing, wherein said signal receiver is a wireless system that receives and processes a plurality of transmitted signals from said wireless communication transmitter and a plurality thereof, wherein said signal receiver and said wireless communication transmitter are wirelessly connected by means of radio signal broadcast, wherein the detector assembly includes at least one detector placed on a ceiling next to a doorway to provide a lighted up way towards the exit.

12. A wirelessly smoke detector, comprising:

a breaker assembly including a main breaker and a signal receiver, wherein said main breaker is an electrical safety device electrically connected to an electrical circuit, said signal receiver is a wireless system operatively connected to said main breaker, wherein said main breaker includes an automated mechanism controlled by said signal receiver to interrupt a current flow of said electrical circuit; and a detector assembly having a circuit board, a selector, a housing, a mount plate, a smoke detector, detector openings, an alarm buzzer, buzzer openings, a wireless communication transmitter, and a light, said smoke detector, said alarm buzzer, said wireless communication transmitter, said selector and said light are electrically connected therebetween by means of said circuit board, wherein said circuit board is housed inside the housing, wherein said signal receiver is a wireless system that receives and processes a plurality of transmitted signals from said wireless communication transmitter and a plurality thereof, wherein said signal receiver and said wireless communication transmitter are wirelessly connected by means of radio signal broadcast, wherein said mount plate includes stoppers that are configured to receive and hold in place said circuit board, said detector openings are placed on a top side of said housing, wherein said detector openings are aligned with respect to said smoke detector, said buzzer openings are place on a top side of said housing, wherein said buzzer openings are aligned with respect to said alarm buzzer, said light has a predetermined colored light, said alarm buzzer emits a predetermined audible alarm according to said predetermined colored light, wherein said breaker assembly and said detector assembly are monitored by means of a monitoring system of an external device, wherein the detector assembly includes at least one detector placed on a ceiling next to a doorway to provide a lighted up way towards the exit.

* * * * *